United States Patent
Goodwin (10) Patent No.: US 8,606,249 B1
(45) Date of Patent: Dec. 10, 2013

(54) METHODS AND SYSTEMS FOR ENHANCING AUDIO QUALITY DURING TELECONFERENCING

(75) Inventor: Michael M. Goodwin, Scotts Valley, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/414,121

(22) Filed: Mar. 7, 2012

Related U.S. Application Data (60) Provisional application No. 61/450,085, filed on Mar. 7, 2011.

(51) Int. Cl.
*H04M 3/42* (2006.01)
*H04B 3/20* (2006.01)
*H04L 12/16* (2006.01)

(52) U.S. Cl.
USPC .......................... 455/416; 370/289; 370/261

(58) Field of Classification Search
USPC ............. 455/416; 379/202.01; 370/289, 261
See application file for complete search history.

(56) References Cited

U.S. PATENT DOCUMENTS

| | | | |
|---|---|---|---|
| 2003/0056220 A1* | 3/2003 | Thornton et al. | 725/62 |
| 2007/0127668 A1* | 6/2007 | Ahya et al. | 379/202.01 |
| 2007/0230712 A1* | 10/2007 | Belt et al. | 381/71.1 |
| 2008/0159507 A1* | 7/2008 | Virolainen et al. | 379/202.01 |
| 2008/0160977 A1* | 7/2008 | Ahmaniemi et al. | 455/416 |
| 2008/0192955 A1* | 8/2008 | Merks | 381/92 |
| 2008/0233934 A1* | 9/2008 | Diethorn | 455/416 |
| 2009/0253418 A1* | 10/2009 | Makinen | 455/416 |
| 2009/0264114 A1* | 10/2009 | Virolainen et al. | 455/416 |

* cited by examiner

*Primary Examiner* — Jinsong Hu
*Assistant Examiner* — Jean Chang
(74) *Attorney, Agent, or Firm* — Carr & Ferrell LLP (57) ABSTRACT

Provided are systems and methods for improving audio signal quality during teleconferencing. Multiple local devices equipped with microphones may be connected to a teleconference hub device that also maintains communication with one or more remote devices. The local devices may be mobile, such as mobile phones, and each may be positioned closer to at least some local teleconference participants compared to a microphone of a traditional central teleconferencing speakerphone. Such mobility allows users to move during the teleconference without disturbing the quality. The local devices may be connected to the hub device using various local protocols. Individual audio signals may first be processed by the local devices and then sent to the hub device for further collective processing of multiple data streams and production of an external data stream, which is sent to remote devices connected to the hub device over a remote protocol.

22 Claims, 5 Drawing Sheets

METHODS AND SYSTEMS FOR ENHANCING AUDIO QUALITY DURING TELECONFERENCING

CROSS-REFERENCE TO RELATED APPLICATION

This application claims the benefit of U.S. Provisional Application No. 61/450,085, filed Mar. 7, 2011. The disclosure of the aforementioned application is incorporated herein by reference in its entirety.

FIELD

This application relates generally to enhancing audio quality during teleconferencing and more specifically to computer-implemented systems and methods for using one or more local devices to capture and process audio signals and to transmit corresponding data streams to a teleconference hub device for further processing and sending to one or more remote devices.

BACKGROUND

Teleconferencing is an essential and indispensable part of today's business world. It is a very cost effective alternative to face-to-face meetings and allows for bringing together people regardless of location to exchange ideas in real time and in an interactive manner. A teleconference may be defined as a live exchange and mass articulation of information among two or more people who are remote from one another, but linked by a telecommunication system. Other terms that are sometimes used include audio conferencing, telephone conferencing, and phone conferencing.

Various telecommunication systems may be used for teleconferencing. Some examples include telephone systems, voice over internet protocol (VoIP) systems, and other like systems. Teleconferencing may include video conferencing, audio streaming, and other types of interactive exchanges that include an audio component.

During a typical teleconference, a calling party wishes to have voice interactions with one or more other parties. A calling party may be a single participant or a group of participants gathered in the same location. Such a group usually uses one teleconferencing device (e.g., a speakerphone) to communicate with other participants and/or groups in other locations. Multiple participants in the same group can generally talk and hear each other directly by virtue of being in the same location. However, when multiple participants of the same group talk at the same time, the quality of a signal captured by a microphone on a teleconferencing device may be poor. Furthermore, some participants may be closer to the teleconferencing device than others, which may cause additional quality issues.

SUMMARY

Provided are systems and methods for improving audio signal quality during teleconferencing. Multiple local devices equipped with microphones may be connected to a teleconference hub device that also maintains communication with one or more remote devices. The local devices may be mobile, such as, but not limited to, mobile phones, and each may be positioned closer to at least some local teleconference participants compared to, for example, a microphone of a central speakerphone traditionally used for teleconferencing. Furthermore, such mobility allows users to move during the teleconference without the movement disturbing the quality. The local devices may be connected to the hub using various local protocols, such as, but not limited to, Wi-Fi and Bluetooth. Individual audio signals may be first processed by the local devices and then sent to the hub for further collective processing of multiple data streams and production of an external data stream, which is sent to the remote devices connected to the hub over a different remote protocol.

This approach allows multiple parties conducting a teleconference to combine usage of their respective local devices into a "mesh" of multiple audio signal receivers (i.e., microphones). Generally, a signal source (i.e., a user) will be closer to one of the respective local devices than a central microphone. Some processing may be performed on an individual local device level. Once the data streams from multiple local devices are received at a teleconference hub device, the hub device further processes these streams to synchronize the data, identify the dominant speaker, suppress unwanted noise and reverberation, and generate an external data stream that is sent to one or more remote devices. Sometimes, these remote devices are referred to as far end devices in order to distinguish them from local devices, which may be also referred to as near end devices. It should be noted that remote devices communicate with a teleconference hub device using one protocol, which may be different from the protocol used for communication between the teleconference hub device and one or more local devices. Examples of local communication protocols are listed above. The external communication may be performed over a telephone network, VoIP, or some other type of networks and/or protocols. In some embodiments, the remote far end device may be in a different location from the near end devices, but still be able to connect via the same protocol, e.g., connect using Wi-Fi from another room in the same facility, used by the near end devices.

As mentioned above, audio signals collected by individual microphones may be first processed by the local devices. For example, various noise reduction algorithms may be applied at each of the distributed microphones prior to providing the data streams corresponding to these audio signals to the hub. In certain embodiments, raw signals may be supplied by local devices to the teleconference hub service. For example, a non-compliant device (i.e., the device not having required processing capabilities) may be included in the mesh. In the hub, the received audio signals are analyzed and processed to provide a clean speech signal for transmission to the outside devices.

In certain embodiments, a teleconferencing method involves registering one or more local devices with a teleconference hub device. Each of the local devices includes at least one microphone for receiving and processing a voice signal. The local devices are provided within the same acoustic space as the teleconference hub device. An acoustic space is defined as a space in which all users of the device can hear each other without a need for intermediate devices and can hear an audio output produced by one of the devices in this space (e.g., a teleconferencing hub device). The method may proceed with receiving one or more local data streams from one or more local devices. The local data streams are received at the teleconference hub device. Each local data stream may include an audio signal received from the corresponding local device. The audio signal may include a voice signal. Each local data stream may also include side information in certain embodiments. The side information may include a local noise estimate or other analysis data associated with the audio signal. The local data streams are received over a local network. The method may involve the teleconference hub device processing the one or more local data streams to produce an external data stream. This processing is based on one or more attributes associated with the local devices. The processing involves noise reduction and/or other forms of processing, such as synchronization of the local data streams and selecting a dominant speaker from the local data streams. The method may also involve sending the external data stream to one or more remote devices using an external network or alternatively, using the internal network if a remote device is within its range. Unlike the local devices, the remote devices are positioned outside of the acoustic space with respect to the teleconference hub device, according to various embodiments.

In certain embodiments, one or more local devices include one or more mobile phones. The mobile phones may include various types of software for processing the received audio signal (for example, for reducing noise in the received audio signal). In certain embodiments, at least one of one or more local devices includes two microphones. Two microphones may improve the quality of the acquired audio signal in comparison to devices equipped with a single microphone. In certain embodiments, a microphone provided on a local device is used for local noise suppression at the local device. The local noise suppression may be based on stationary noise suppression.

In certain embodiments, registering involves synchronizing a timer of each local device with a timer of the teleconference hub device. Registering may involve generating a spatial map of one or more local devices. Processing may be performed to generate a map of the locations of the devices. At some time after the registering has occurred, a spatial map of acoustic sources may be derived based on the one or more local data streams received by the teleconference hub device. A spatial map of acoustic sources may be used for characterizing acoustic sources and/or tracking the location of acoustic sources, e.g., track if one of the sources moves within the acoustic space. A spatial map of acoustic sources may be a part of the one or more attributes used during processing of the one or more local data streams by the teleconference hub device. A spatial map of acoustic sources may be used to discriminate between desired speech components and unwanted noise components in the local data streams.

In certain embodiments, processing one or more local data streams by the teleconference hub device involves selecting one data stream corresponding to one local device from multiple local data streams received from multiple local devices. This selection may be based on various criteria, such as signal strengths received at various devices, noise levels, and other such factors. In certain embodiments, processing one or more local data streams involves clustering. During clustering, portions of different data streams are associated to one acoustic source. Examples of acoustic sources include noise sources, talkers, and other types of sources. In certain embodiments, the processing further comprises adaptively combining the one or more local streams to produce the external data stream.

In certain embodiments, the method also involves receiving an inbound data stream from a remote device and generating an audio output corresponding to the inbound data stream at the teleconference hub device. In the same or other embodiments, the method involves generating one or more local data streams at the teleconference hub device based on one or more audio signals captured by one or more microphones on the teleconference hub device.

Also provided is a teleconference hub device, which may include a local communication module, processing module, and remote communication module. The local communication module is used for establishing local data communication with one or more local devices positioned within the same acoustic space as the teleconference hub device. The local data communication is performed according to one or more wireless local network protocols. The processing module is used for analyzing and processing one or more local data streams received from the one or more devices by the local communication module. The processing module is configured to generate an external data stream from the one or more local data streams based on one or more attributes associated. In certain embodiments, generation of the external data involves noise reduction. The remote communication module is used for establishing remote data communication with one or more remote devices positioned outside of the acoustic space of the teleconference hub device. The remote communication module may be configured to transmit the external data stream generated by the processing module. In certain embodiments, the processing module is configured to select dominant speech components or desired speech components from the one or more local data streams based on analyzing and processing the received data.

In certain embodiments, the teleconference hub device includes a speaker for generating an audio output corresponding to an inbound data stream received by the remote communication module from the one or more remote devices. In the same or other embodiments, the teleconference hub device includes one or more microphones for generating one or more local data streams at the teleconference hub device based on one or more audio signals received by the teleconference hub device. The processing module may be configured to register the one or more local devices and provide timing information to the one or more local devices through the local communication module. The processing module may be also configured to generate a spatial map of acoustic sources based on the one or more local data streams received from the one more devices.

Other features, examples, and embodiments are described below.

DESCRIPTION OF EXEMPLARY EMBODIMENTS

Teleconferencing often suffers from a poor quality audio signal, particularly when multiple participants on one end share the same device, such as a speakerphone. Some teleconferencing systems provide multiple microphones and multidirectional microphones. However, such systems tend to be expensive and their microphones lack mobility. During a typical teleconference, participants are often located at different distances from a shared device and may sometimes move, such as to approach white boards. These proximity differences and the mobility of speakers significantly impact the audio quality on the other end.

At the same time, many people nowadays have mobile phones and other portable devices equipped with microphones and various communication systems. For example, modern laptops and mobile phones often support Wi-Fi, Bluetooth, Infrared, and/or other types of local communication protocols. Certain embodiments of the methods and systems of the present invention rely on microphones provided on such mobile devices to capture an audio signal generated by its user (i.e., user's speech during a teleconference) and deliver that signal in a processed form (or not) to a teleconference hub device. These mobile devices may be present in the same acoustic space with the teleconference hub device, such that users of these devices can hear each other directly and can all hear an audio signal produced by the teleconference hub device. Additional devices are connected to the teleconference hub device using an external network, such as using a VoIP protocol or telephone line. These additional devices are present outside of the acoustic space of the teleconference hub device and may be referred to as remote devices.

Some features of the provided methods and systems may be best understood from the following example, which is by no means limiting. A teleconference may be established between a teleconference hub device and one or more remote devices by known methods, for example, using a conference number and a pin code. Either one of these devices may be a leader in the call. The teleconference hub device may be used by one or more users present in the same location, which is generally referred to the same acoustic space. Some or all of these users have their own devices (i.e., local devices) that are connected to the teleconference hub device using a local communication network. In certain embodiments, the users and their devices may be present in a different acoustic space than the teleconference hub device. However, the local devices still maintain communication with the teleconference hub device. These embodiments may be used when a meeting has to be moved to another nearby conference room. Various features of these embodiments are further described below. Furthermore, in certain embodiments, one or more remote devices may be teleconference hub devices themselves. In these embodiments, two or more teleconference hub devices are interconnected using VoIP protocols and/or telephone lines. Each of these teleconference hub devices may be connected to a local subset of devices forming a node of the teleconference.

Returning to the initial example, local device users register or otherwise connect their devices to the teleconference hub device. At this point, the local devices can be used as external microphones for the teleconference hub device. On average, at least one of the microphones of the local devices can be positioned much closer to the signal source (i.e., user) compared to the central teleconference hub device and its associated microphone. Furthermore, the mobility of the local devices allows their users to move together with their devices within the acoustic space and maintain proximity between the user and microphone. For example, a user may go to a white board during a teleconference and take his or her device. In more specific embodiments, all local users may relocate to a new acoustic space with their devices when, for example, a teleconference runs longer than initially planned, and a conference room needs to be vacated. In certain embodiments, the teleconference hub device may stay in the original location and one of the local devices may be used to provide an audio output, which was previously provided by the teleconference hub device.

Once the local devices are registered, audio signals from these devices are transmitted to the teleconference hub device. In certain embodiments, the local devices perform some initial processing of the audio signal received by their respective microphones. For example, a local device may perform local noise suppression or, more specifically, stationary noise suppression. In other embodiments, a local device may provide a raw signal to the teleconference hub device. These features depend on the configuration of the local devices, such as their processing capabilities.

The teleconference hub device then collectively processes multiple audio signals and generates an external data stream based on these signals for transmission to the remote devices. The teleconference hub device may synchronize multiple data packets from different local devices based on their time stamp. Furthermore, the teleconference hub device may provide additional noise suppression and identify desired speech components.

When the teleconference hub device receives data streams from external devices, a corresponding audio signal may be produced by the teleconference hub device and/or one or more local devices. For example, local participants may choose to use their devices to listen to outside participants in addition to or instead of listening to audio signal produced by the teleconference hub device. This flexibility also allows moving local participants to a new location (e.g., a new conference room) while maintaining the teleconference.

The provided methods and systems allow multiple parties conducting a communication session, such as, but not limited to, a teleconference, to combine usage of their respective mobile devices into a "mesh" to identify desired speech components and suppress unwanted noise, reverberation, and the like. Only one device (i.e., the teleconference hub device) is responsible for communicating to the remote devices, which may be referred to as far end nodes or simply the far end. As explained above, audio signals from the mesh-connected phones are provided to the teleconference hub device (e.g., via Bluetooth, Wi-Fi, or some other local data communication protocol). These audio signals may be processed by a noise reduction algorithm at each of the distributed microphones prior to being provided to the teleconference hub device, also referred to herein as the "hub". Raw signals may also be supplied (in the event that non-compliant devices may be included in the mesh). In the hub, the received audio signals are analyzed and processed to provide a clean speech signal for transmission.

An embodiment for communicating with one or more mobile devices may include establishing a communication session between local devices and a teleconference hub device. Each local device may have one or more microphones. Audio data may then be communicated between local devices and the teleconference hub device. The teleconference hub device may transmit noise reduced audio data on behalf of the local devices to the external devices. The noise reduced audio data may be processed to remove noise, echo, or other non-speech or non-desired components of the audio signal.

The provided methods and systems support various scenarios where one or more of the sites in a teleconference include a group of individuals in a shared acoustic space (e.g., a conference room). In such cases, the quality of the audio received from a multi-party site may be severely compromised by a number of factors (for instance poor positioning of the pickup microphones for the conferencing talkers, unwanted noise sources in the room (such as projector/laptop fans and keystrokes), etc.). In high-end systems, there is an attempt to address such issues using directional microphones for speech reception; however, such installations tend to be prohibitively expensive and not adapt to mobility of the users. For affordable, portable solutions, it would be of interest to have a system wherein a microphone is positioned close to each talker, and wherein the respective microphone signals are adaptively combined to provide a clear speech signal to the far end teleconferencing site(s). Some commercial systems include multiple microphones for distribution on a tabletop, but these are limited by (1) a fixed number of microphones and (2) tethering by wired connections. The present technology overcomes these limitations and provides a practical, low-cost, portable solution for teleconferencing.

The provided methods and systems leverage the widespread ownership of portable communication devices (e.g., cellphones/smartphones). Multiple parties at a teleconferencing site may combine their respective devices such as phones into a "mesh" wherein the phones cooperate to identify a dominant speaker and suppress unwanted noise, reverberation, and the like. One phone may be responsible for communicating to the far end. Audio signals from the mesh-connected phones may be provided to the "hub" device (e.g., via Bluetooth or Wi-Fi). These audio signals are ideally processed by a high quality noise suppressor at each of the distributed microphones prior to being provided to the hub, but raw signals may also be supplied (in the event that devices incapable of high-quality noise suppression are included in the mesh). In the hub, the received audio signals are analyzed and processed to provide a clean speech signal for transmission.

Figure 1:
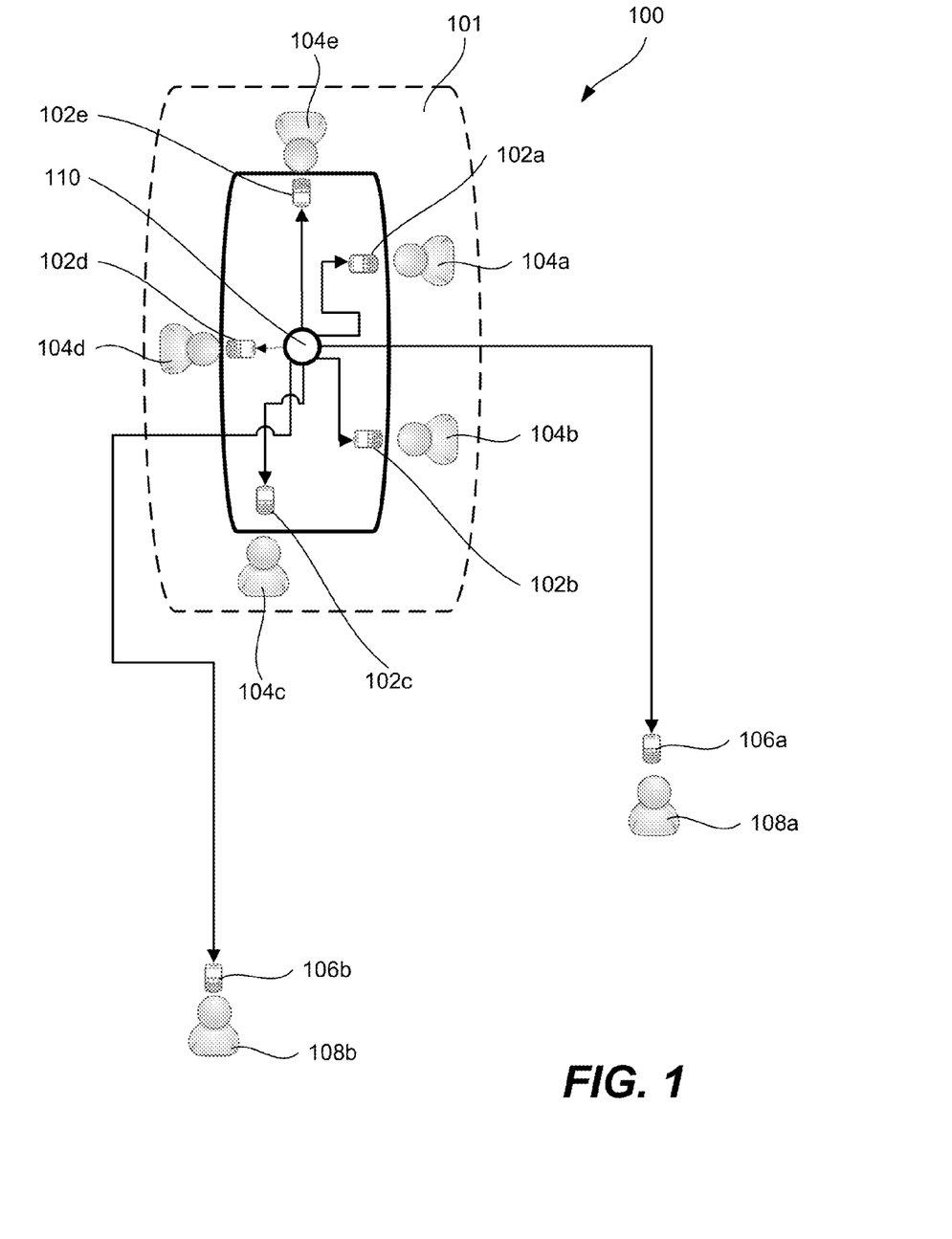
FIG. 1 is a schematic representation of an exemplary system including multiple local devices connected to and located within the same acoustic space as a teleconference hub device, and multiple remote devices separately connected to the teleconference hub device and located outside of the acoustic space, in accordance with certain embodiments.

FIG. 1 is a schematic representation of an exemplary system 100 including multiple local devices 102a-102e connected to teleconference hub device 110, in accordance with certain embodiments. Local devices 102a-102e may be allocated to specific users 104a-104e, as shown in FIG. 1, though the system is not limited to the number of local devices and users shown. In certain embodiments, one local device may be shared by multiple users. In the same or other embodiments, one user may utilize multiple devices. Local devices 102a-102e and users 104a-104e may be present in the same acoustic space 101. In certain embodiments, teleconference hub device 110 is also provided in the same acoustic space 101. In other embodiments, teleconference hub device 110 may be present in another acoustic space, though on the same local communication network as the local devices, in which instance the teleconference hub device 110 may recognize that playback of the far-end signal and capture of local audio signals may be performed by one or more of local devices 102a-102e.

The exemplary system 100 also includes remote devices 106a and 106b. Users 108a and 108b may use corresponding remote devices 106a and 106b to communicate with teleconference hub device 110, though the system is not limited to the number of remote devices and remote users shown. Users 108a and 108b and remote devices 106a and 106b in the example in FIG. 1 are outside of acoustic space 101 shared by local devices 102a-102e and users 104a-104e. Remote devices 106a and 106b may use an external network for communicating with teleconference hub device 110. At the same time, local devices 102a-102e are connected to teleconference hub device 110 using a local network. Generally, the external network and local network use different communication protocols. For example, the external network may be based on VoIP protocol or telephone lines, while the local network may be based on Wi-Fi, Bluetooth, and/or Infrared protocols. In some embodiments, a device may be outside of acoustic space 101, but still able to use the local network used by local devices (e.g., still within range of the same Wi-Fi network).

While different users 104a-104e are shown to be at different distances from teleconference hub device 110, each user may be relatively close to his or her local device. Instead of picking up audio signals through teleconference hub device 110, each of local devices 102a-102e may pick up audio signals based on proximity of the various sources from the respective local device. Local devices 102a-102e act as extension microphones for teleconference hub device 110. Furthermore, local devices 102a-102e may move with their users, so as to maintain proximity between the device and a corresponding user.

Figure 2:
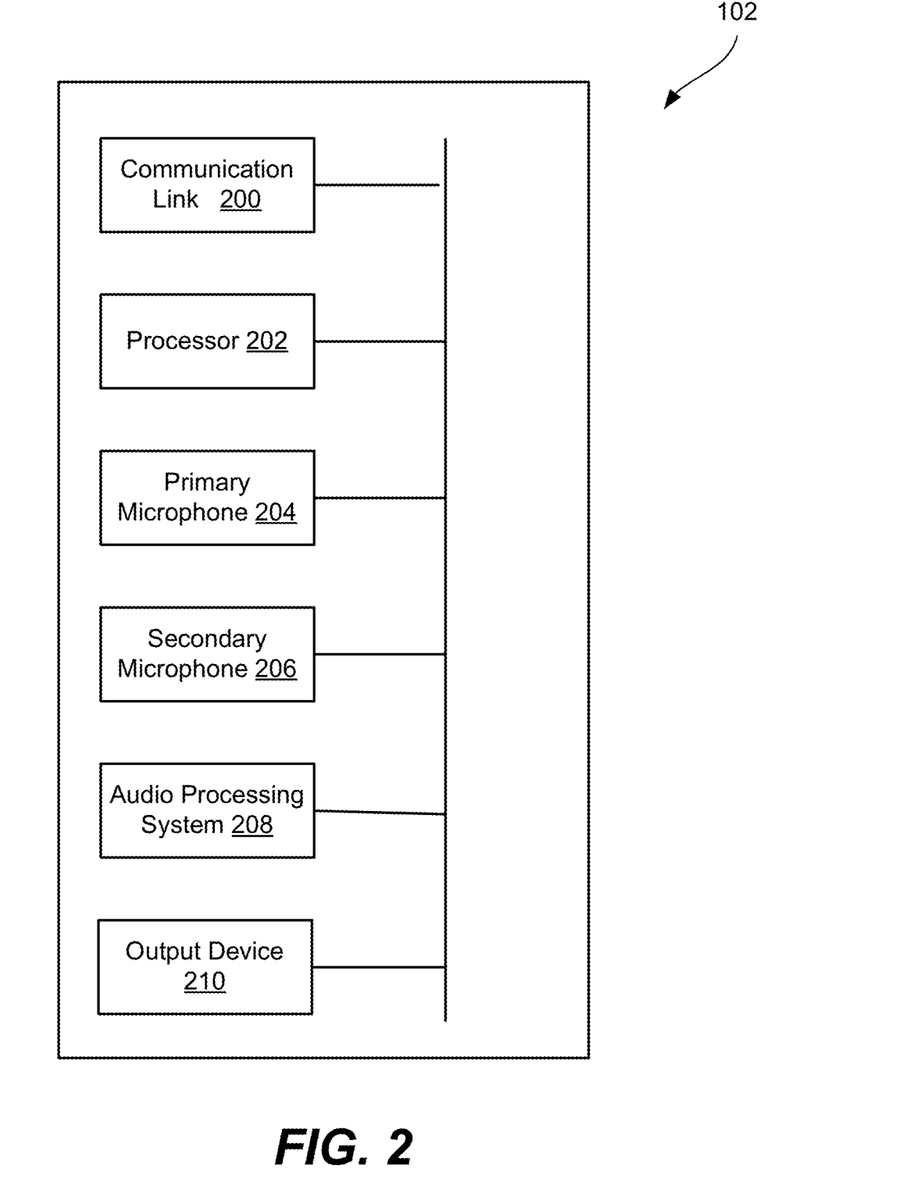
FIG. 2 is a schematic representation of various components of the local device, in accordance with certain embodiments.

FIG. 2 is a schematic representation of various components of local device 102, in accordance with certain embodiments. In exemplary embodiments, local device 102 is an audio receiving device that includes communication link 200, processor 202, primary microphone 204, secondary microphone 206, audio processing system 208, and/or output device 210. Not all of these components need to be present in local device 102. Furthermore, other components may be used in addition or instead of those shown. In certain embodiments, local device 102 includes one microphone (e.g., primary microphone 204) and communication link 200. Audio signals received by the one or more microphones of a local device 102 may be sent in a raw format to a teleconference hub device using communication link 200. As explained above, communication link 200 may support Wi-Fi, Bluetooth, infrared, and/or some other local communication protocol. In another embodiment, local device 102 also includes audio processing system 208. Audio processing system 208 may be used to perform noise suppression on a local device before the corresponding data stream is sent to the teleconference hub device.

Communication link 200 may be configured to send and receive signals to a teleconference hub device through a local network. In some embodiments, communication link 200 includes an antenna or some other type of transmitter. Processor 202 may include hardware and/or software configured to perform local infrastructure processing, including, but not limited to, processing associated with timing, registration and transmission of the data. Processor 202 may also control operations of various other devices.

Audio processing system 208 may be configured to receive the acoustic signals from an acoustic source via primary and secondary microphones 204 and 206 and process these acoustic signals in addition to or instead of processor 202. Primary and secondary microphones 204 and 206 may be spaced a distance apart such that acoustic source signals arriving at the respective microphones have energy level differences and/or time-of-arrival differences between them. After reception by microphones 204 and 206, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by primary microphone 204 is herein referred to as the primary acoustic signal, while the acoustic signal received by secondary microphone 206 is herein referred to as the secondary acoustic signal. It should be noted that embodiments of the present technology may be practiced utilizing any number of microphones. Output device 210 is any device that provides an audio output to a listener (e.g., an acoustic source). For example, output device 210 may comprise a speaker, an earpiece of a headset, or a handset on local device 102.

In various embodiments, where the primary and secondary microphones 204 and 206 are omni-directional microphones that are closely-spaced (e.g., 1-2 cm apart), a beamforming technique may be used to simulate a forward-facing and backward-facing directional microphone response. A level difference may be obtained using the simulated forwards-facing and backwards-facing directional microphones. The level difference may be used to discriminate speech and noise in the time-frequency domain, which can be used in noise and/or echo reduction/suppression.

Embodiments of the present invention may be practiced on any device that is configured to receive and/or provide audio such as, but not limited to, cellular phones, phone handsets, headsets, and systems for teleconferencing applications.

In certain embodiments, local device 102 may be a laptop or some other portable computer system. Smaller local devices, such as smartphones, allow more flexibility in setting up the resulting "mesh." The provided method and systems may allow adaptive sharing of the per-stream processing. The adaptive sharing may depend on whether the constituent devices are equipped with noise reduction hardware and/or software. For example, local devices may provide either processed or raw audio to the hub device (which may have compatible hardware and/or software) for final processing and signal delivery. If all devices are compatible, the resulting audio may be improved with respect to a hybrid compatible/non-compatible hardware system mesh.

Some or all of the above-described modules can be comprised of instructions that are stored on storage media. The instructions can be retrieved and executed by processor 202. Some examples of instructions include software, program code, and firmware. Some examples of storage media comprise memory devices and integrated circuits. The instructions are operational when executed by processor 202 to direct processor 202 to operate in accordance with embodiments of the present invention. Those skilled in the art are familiar with instructions, processor(s), and (computer readable) storage media.

Figure 3:
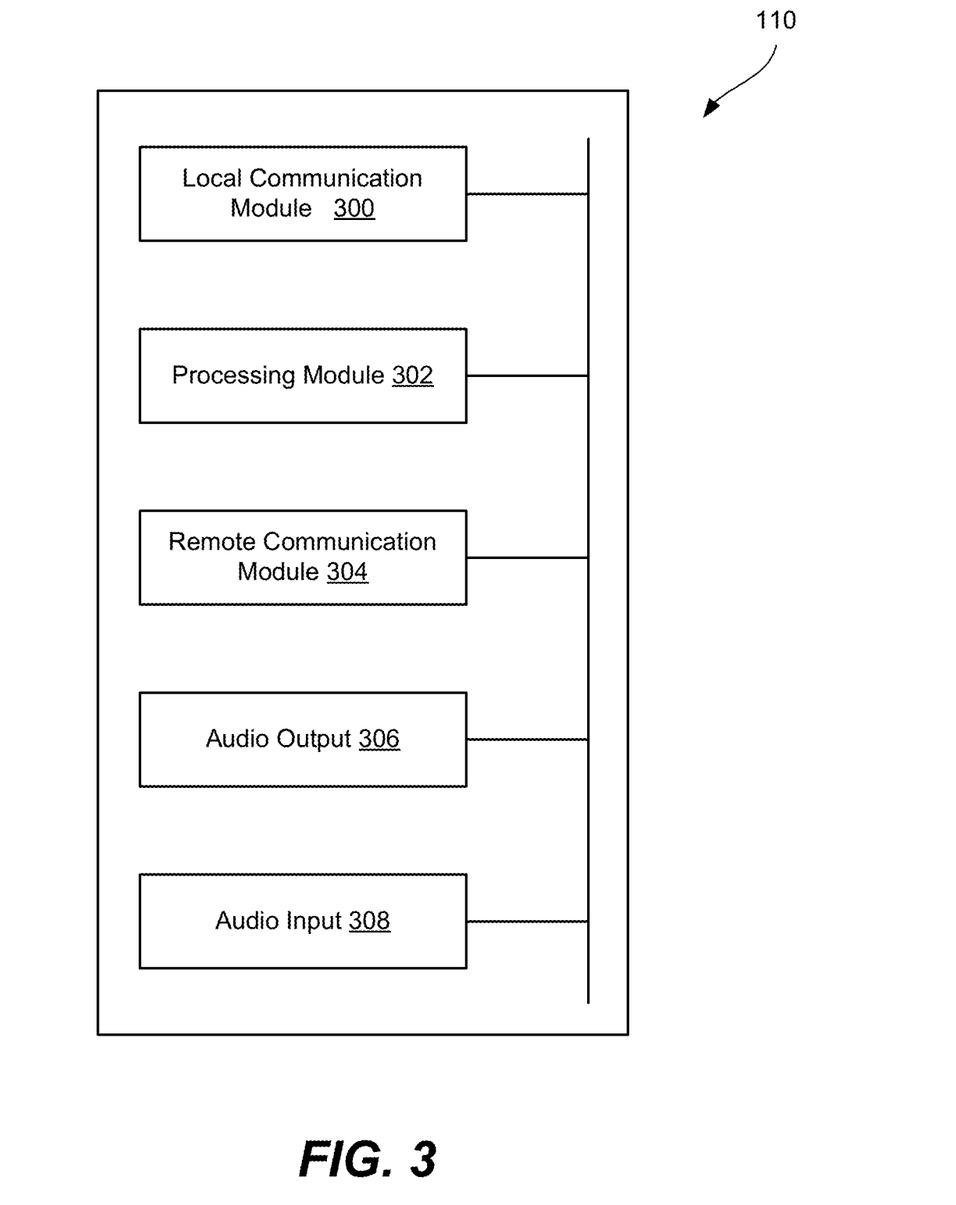
FIG. 3 is a schematic representation of various modules of the teleconference hub device, in accordance with certain embodiments.

FIG. 3 is a schematic representation of various modules of teleconference hub device 110, in accordance with certain embodiments. Specifically, FIG. 3 illustrates local communication module 300, processing module 302, remote communication module 304, audio output 306, and audio input 308. Local communication module 300 may be used for establishing local data communication with one or more local devices positioned within the same acoustic space as the teleconference hub device. The local data communication is performed according to one or more wireless local network protocols described above.

Processing module 302 may be used for analyzing and processing one or more local data streams received from one or more local devices by the local communication module. Processing module 302 may be configured to generate an external data stream from the one or more local data streams based on one or more associated attributes. In certain embodiments, generation of the external data involves noise reduction. In certain embodiments, processing module 302 is configured to select a dominant speech component and/or desired speech components among two or more devices based on analyzing and processing the received data. In other embodiments, processing module 302 is configured to extract speech from the received data by adaptively combining and processing the received data. Processing module 302 may be configured to register one or more local devices and provide timing information to the one or more local devices through the local communication module. Processing module 302 may be also configured to generate a spatial map of acoustic sources based on the one or more local data streams received from the one more devices.

Remote communication module 304 may be used for establishing remote data communication with one or more remote devices positioned outside of the acoustic space of the teleconference hub device. Remote communication module 304 may be configured to transmit the external data stream generated by the processing module 302.

Audio output 306 may include a speaker for generating an audio output corresponding to an inbound data stream received by remote communication module 304 from the one or more remote devices. Audio input 308 may be a microphone for generating a local data stream at the teleconference hub device 110 based on a voice signal received by the teleconference hub device 110.

Figure 4:
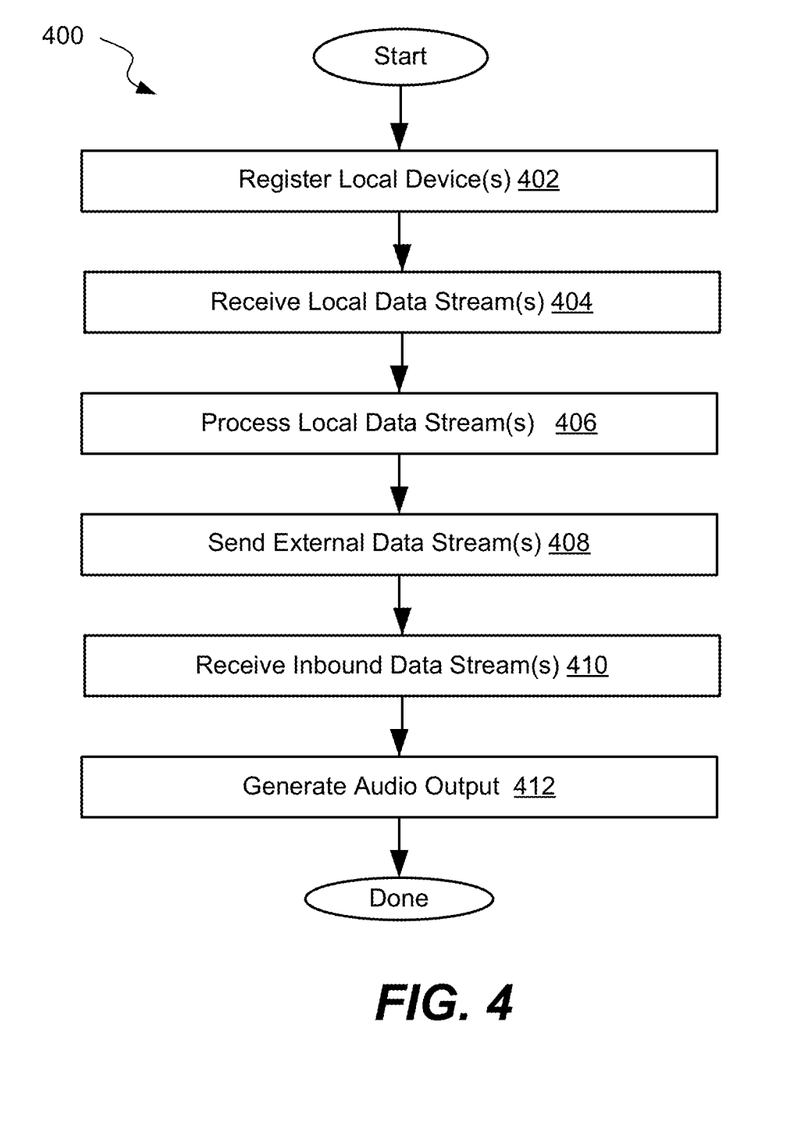
FIG. 4 is a process flow chart corresponding to an exemplary teleconferencing method using a teleconference hub device to connect to one or more local devices and also to separately connect to one or more remote devices.

FIG. 4 is a process flow chart corresponding to teleconferencing method 400 using a teleconference hub device to connect to one or more local devices and to separately connect to one or more remote devices, in accordance with certain embodiments. Various examples of teleconference hub devices and local devices are presented above. Teleconferencing method 400 may start with registering one or more local devices with a teleconference hub device in operation 402. As described above, the local devices include microphones for receiving and processing voice signals and may be provided within the same acoustic space with respect to each other and, in more specific embodiments, with respect to the teleconference hub device. Registering operation 402 may involve establishing and sharing a time stamp such that all devices operate with the same time reference. In some embodiments, registering operation 402 includes deriving an initial spatial map of the locations of the local devices. The spatial map may be used for further processing and/or analysis of the one or more local data streams.

Teleconferencing method 400 may proceed with receiving one or more local data streams from the one or more local devices at the teleconference hub device during operation 404. Each local data stream may comprise an audio signal received from the corresponding local device. The audio signal may include a voice signal. The local data stream may also include side information in certain embodiments. The side information may include a local noise estimate or other analysis data associated with the audio signal. The one or more local data streams may be received over a local network. The data streams are then processed by the teleconference hub device to produce an external data stream as reflected by operation 406. Processing may be based on one or more attributes associated with the one or more local devices and comprises noise reduction. Processing may be performed in multiple stages. The stages may be performed at least in part on one or more of the local devices, if so equipped, in addition to being performed in the teleconference hub device.

In some embodiments, the first stage of processing may be a transform stage. The transform stage uses a Fast Cochlea Transform (FCT) to convert the time-domain signal into a set of band-passed cochlear signals or Analytic Cochlea Samples (ACS). The FCT implements a series of cascaded, complex-valued, first-order Infinite Impulse Response (IIR) filters. The subband center frequencies may be spread logarithmically in frequency over roughly 5 octaves for a narrowband configuration and 7 octaves for a wideband configuration. The bandwidths of the subbands correspond roughly to the critical bandwidths in the human auditory system. Further details regarding the first stage are described in U.S. patent application Ser. No. 11/441,675, incorporated by reference herein in its entirety.

The second stage of processing may be a cancellation stage. The cancellation stage may use a beamformer to subtract from the primary microphone signal noise and/or echo components that are correlated with the other microphone signal(s). An example of a beamformer is Null-Processing Noise Subtraction (NPNS). Further details regarding NPNS are described in U.S. patent application Ser. No. 12/422,917, incorporated by reference herein in its entirety.

The third stage of processing may be a post-filter stage. In the post-filter stage, a time-frequency mask may be applied to the output ACS of the cancellation stage to produce the modified ACS, thereby achieving additional noise and/or echo reduction. The time-frequency mask may be determined using an analysis path sub-system that may include feature extraction modules, source inference modules and mask generation modules. Feature extraction may include frame energy estimation, Inter-microphone Level Difference (ILD) computation and pitch estimation. Source inference may include noise estimation and/or noise and speech modeling. Mask generation may include a Wiener filter and Voice Quality Optimized Suppression (VQOS). The VQOS is described in further detail in U.S. patent application Ser. No. 12/832,901, incorporated by reference herein in its entirety.

The fourth stage of processing may be a reconstruction stage. In the reconstruction stage, the modified ACS may be added and delayed in each subband to obtain a time-domain modified noise and/or echo suppressed signal. The present technology provides improved noise cancellation and may be applied to both close-talk as well as hand-held speakerphone use cases. Further details regarding the fourth and other stages is described in U.S. patent application Ser. No. 11/343,524, incorporated by reference herein in its entirety.

Other stages may be performed to process audio signals using the present technology. For example, the present system may transform acoustic time domain signals to the cochlea domain as subband signals, extract features from the subband signals, cancel noise in the subband signals via noise subtraction techniques, generate a multiplicative mask and apply the multiplicative mask to the noise-subtracted subband signals via a noise suppression process, transform the noise suppressed cochlea subband signals back to the time domain, and perform post processing to the signals.

A highly directional response of a device may indicate that a beamformer is used. If a device suppresses noise by a greater amount than the theoretical limit for noise cancellation in diffuse noise based upon the microphone spacing, this may indicate that a post-filter is used. If the amount of suppression being applied varies across frequency (e.g., voice harmonics are not attenuated, but the noise between the harmonics is attenuated) or the latency of their system can be measured and is greater than −5 ms, these may indicate that a subband analysis using a transform stage and reconstruction stage is used.

Method 400 may proceed with sending the external data stream to external devices in operation 408. This communication is generally performed using a communication protocol that is different from the communication protocol used for communication with local devices.

In certain embodiments, method 400 may involve receiving inbound data streams from the external devices in operation 410. Once the inbound data stream is received, method 400 may proceed with generating corresponding audio output in operation 412. Audio output may be generated on the teleconference hub device and/or one or more local devices.

Figure 5:
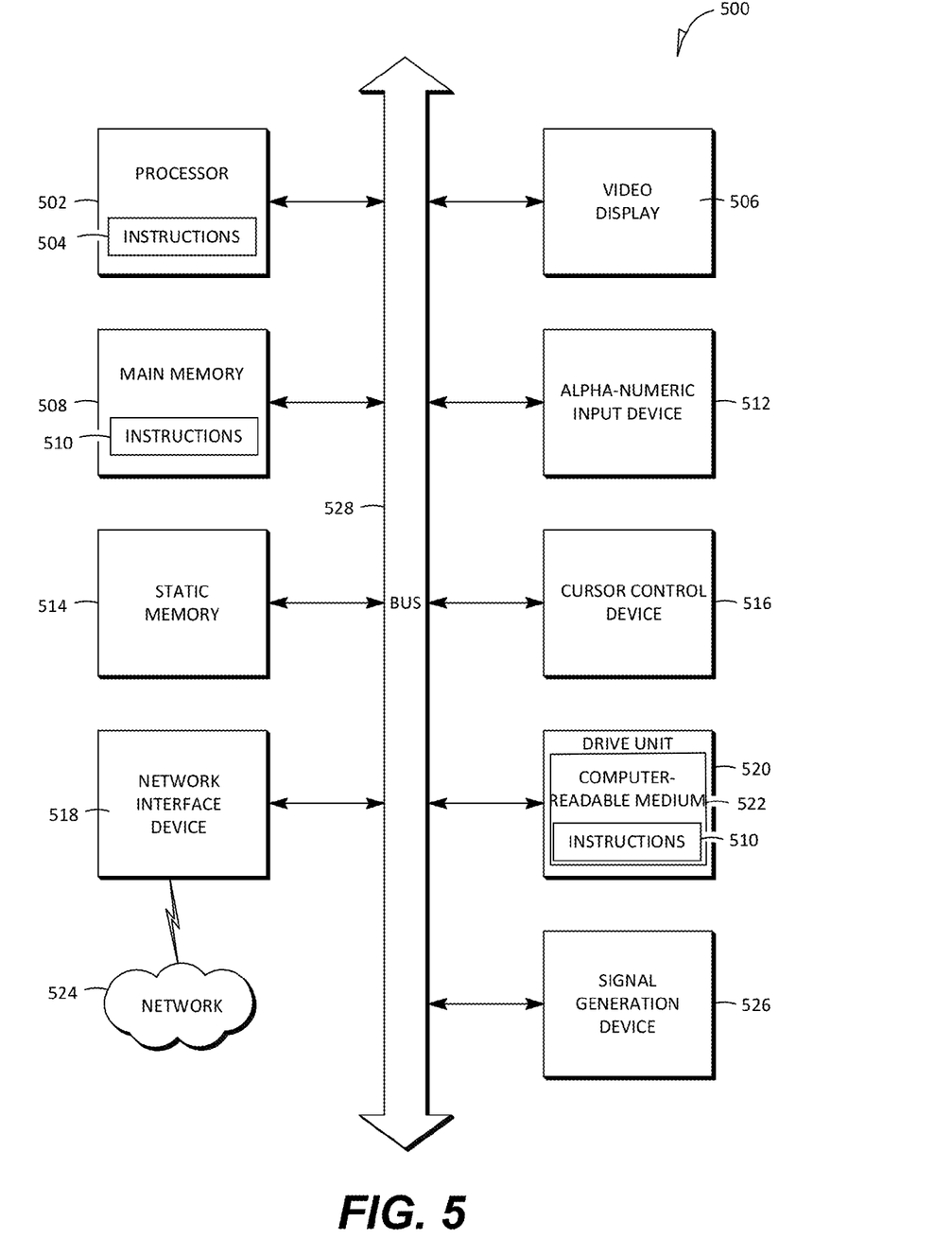
FIG. 5 is a diagrammatic representation of an example machine in the form of a computer system, within which a set of instructions for causing the machine to perform any one or more of the methodologies discussed herein may be executed.

FIG. 5 is a diagrammatic representation of an example machine in the form of a computer system 500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), for executing instructions 504, and a main memory 508 and static memory 514, which communicate with each other via a bus 528. The computer system 500 may further include a video display unit 506 (e.g., a liquid crystal display (LCD)). The computer system 500 may also include an alpha-numeric input device 512 (e.g., a keyboard), a cursor control device 516 (e.g., a mouse), a voice recognition or biometric verification unit, a disk drive unit 520, a signal generation device 526 (e.g., a speaker) and a network interface device 518. The computer system 500 may further include a data encryption module (not shown) to encrypt data.

The disk drive unit 520 includes a computer-readable medium 522 on which is stored one or more sets of instructions and data structures (e.g., instructions 510) embodying or utilizing any one or more of the methodologies or functions described herein. The instructions 510 may also reside, completely or at least partially, within the main memory 508 and/or within the processors 502 during execution thereof by the computer system 500. The main memory 508 and the processors 502 may also constitute machine-readable media.

The instructions 510 may further be transmitted or received over a network 524 via the network interface device 518 utilizing any one of a number of well-known transfer protocols (e.g., Hyper Text Transfer Protocol (HTTP)).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A teleconferencing method comprising:
   registering one or more local devices with a teleconference hub device, each of the one or more local devices including at least one microphone for receiving audio signals, the one or more local devices being provided within the same acoustic space as the teleconference hub device, wherein registering comprises generating a spatial map of the one or more local devices within the acoustic space, the spatial map for use for analysis of one or more local data streams;
   receiving the one or more local data streams from the one or more local devices at the teleconference hub device, each local data stream comprising an audio signal received from the corresponding local device, the one or more local data streams received over a local network;
   processing the one or more local data streams by the teleconference hub device to produce an external data stream, the processing comprising noise reduction; and
   sending the external data stream to one or more remote devices using an external network, the one or more remote devices being positioned outside of the acoustic space with respect to the teleconference hub device.

2. The teleconferencing method of claim 1, wherein the one or more local devices comprise one or more mobile phones.

3. The teleconferencing method of claim 1, wherein at least one of the one or more local devices includes two microphones.

4. The teleconferencing method of claim 1, wherein at least one of the one or more local devices includes processing for providing local noise suppression.

5. The teleconferencing method of claim 4, wherein the local noise suppression comprises stationary noise suppression.

6. The teleconferencing method of claim 1, wherein registering comprises synchronizing a timer associated with each of the one or more local devices with a timer associated with the teleconference hub device.

7. The teleconferencing method of claim 1, wherein processing is based on one or more attributes associated with the one or more local devices.

8. The teleconferencing method of claim 7, wherein the spatial map of acoustic sources is part of the one or more attributes used during processing of the one or more local data streams by the teleconference hub device.

9. The teleconferencing method of claim 1, wherein processing of the one or more local data streams by the teleconference hub device comprises selecting one data stream corresponding to one local device from multiple local data streams received from multiple local devices.

10. The teleconferencing method of claim 1, wherein processing the one or more local data streams comprises clustering to associate portions of different data streams to one acoustic source.

11. The teleconferencing method of claim 1, wherein processing further comprises adaptively combining the one or more local streams to produce the external data stream.

12. The teleconferencing method of claim 1, further comprising receiving an inbound data stream from the one or more remote devices and generating an audio output corresponding to the inbound data stream at the teleconference hub device.

13. The teleconferencing method of claim 1, the teleconference hub device comprising at least one microphone, the method further comprising generating one or more local data streams at the teleconference hub device based on the audio signals received by the at least one microphone of the teleconference hub device.

14. A teleconference hub device comprising:
   a local communication module for establishing local data communication with one or more local devices positioned within the same acoustic space as the teleconference hub device, the local data communication being performed according to one or more wireless local network protocols;
   a processing module for analyzing and processing one or more local data streams received from the one or more local devices by the local communication module, the processing module being configured to generate an external data stream from the one or more local data streams based on one or more attributes associated therewith, generation of the external data stream comprising noise reduction, the processing module being further configured to generate a spatial map of acoustic sources within the acoustic space based on the one or more local data streams received from the one or more local devices; and
   a remote communication module for establishing remote data communication with one or more remote devices positioned outside of the acoustic space of the teleconference hub device, the remote communication module being configured to transmit the external data stream generated by the processing module.

15. The teleconference hub device of claim 14, wherein the processing module is further configured to select one or more speech components from among the received one or more local data streams based on analyzing and processing the received one or more local data streams.

16. The teleconference hub device of claim 14, further comprising a loudspeaker for generating an audio output corresponding to an inbound data stream received by the remote communication module from the one or more remote devices.

17. The teleconference hub device of claim 14, further comprising at least one microphone for generating at least one local data stream at the teleconference hub device based on an audio signal received by the teleconference hub device.

18. The teleconference hub device of claim 14, wherein the processing module is further configured to register the one or more local devices such that timing associated with each of the one or more local devices is aligned with timing of the teleconference hub device.

19. The teleconferencing method of claim 1, wherein at least one of the one or more local data streams further comprises side information received from the corresponding local device.

20. The teleconferencing method of claim 19, wherein the side information comprises a local noise estimate.

21. A teleconferencing method comprising:
   registering one or more local devices with a teleconference hub device, each of the one or more local devices including at least one microphone for receiving audio signals, the one or more local devices being provided within the same acoustic space as the teleconference hub device, wherein registering comprises generating a spatial map of the one or more local devices within the acoustic space, the spatial map for use for further analysis of the one or more local data streams;

receiving one or more local data streams from the one or more local devices at the teleconference hub device, each local data stream comprising an audio signal received from the corresponding local device, the one or more local data streams received over a local network, at least one of the one or more local data streams comprising a local noise estimate;

processing the one or more local data streams by the teleconference hub device to produce an external data stream, the processing comprising noise reduction, wherein the processing is based on one or more attributes associated with the one or more local devices, the spatial map of acoustic sources being part of the one or more attributes, the processing comprising clustering to associate portions of different data streams to one acoustic source; and sending the external data stream to one or more remote devices using an external network, the one or more remote devices being positioned outside of the acoustic space with respect to the teleconference hub device.

22. A non-transitory computer readable storage medium having embodied thereon a program, the program being executable by a processor to perform a teleconferencing method, the teleconferencing method comprising:

registering one or more local devices with a teleconference hub device, each of the one or more local devices including at least one microphone for receiving audio signals, the one or more local devices being provided within the same acoustic space as the teleconference hub device, wherein registering comprises generating a spatial map of the one or more local devices within the acoustic space, the spatial map for use for analysis of one or more local data streams;

receiving the one or more local data streams from the one or more local devices at the teleconference hub device, each local data stream comprising an audio signal received from the corresponding local device, the one or more local data streams received over a local network;

processing the one or more local data streams by the teleconference hub device to produce an external data stream, the processing comprising noise reduction; and sending the external data stream to one or more remote devices using an external network, the one or more remote devices being positioned outside of the acoustic space with respect to the teleconference hub device.

* * * * *